June 30, 1970

R. S. REAUME

3,518,543

DEVICE FOR SETTING A METER TO TRUE ZERO

Filed Oct. 8, 1968

Inventor
Robert S. Reaume
By Ralph D. Hohenfeldt

Attorney

United States Patent Office 3,518,543
Patented June 30, 1970

3,518,543
DEVICE FOR SETTING A METER TO TRUE ZERO
Robert S. Reaume, Brookfield, Wis., assignor to General
Electric Company, a corporation of New York
Filed Oct. 8, 1968, Ser. No. 765,797
Int. Cl. G01r *15/08, 1/02*
U.S. Cl. 324—115                                  2 Claims

ABSTRACT OF THE DISCLOSURE

A meter that displays the electric analog signal of a physiological characteristic or other characteristic that is being monitored is set to true zero when there is no input signal. The meter is normally energized through a high impedance. The high impedance is shunted by a low impedance and a switch. A new device enables zero adjustment of the input signal and operation of the switch while adjustment is being made. Switching the low impedance into the meter circuit effects increased meter sensitivity during adjustment. Changing sensitivity causes the meter to deflect momentarily if true zero has not been attained. The eyes can perceive deflection better than they perceive a steady departure from zero.

BACKGROUND OF THE INVENTION

In electric measuring apparatus, it is frequently necessary to adjust an amplifier or the like for zero output when there is no sensible input signal. This is usually done by adjusting a potentiometer, for example, until a meter which is under observation reads apparent zero when the amplifier output is supposedly zero. Usually, however, the eyes are not able to resolve small departures of the meter indicator from true zero. Parallax between the moveable and stationary indicating elements of the meter also cause an error in reading true zero. Thus, different operators may reach different apparent zero settings.

SUMMARY OF THE INVENTION

An object of the invention is to provide a device that will enable an operator to set the output of an amplifier or the like to zero while compensating adjustments are being made and at the same time learn with great accuracy by observing a meter whether true zero has been attained.

A typical apparatus with which the new zero setting device may be used is in a blood pressure monitor. In this case, a transducer converts blood pressure to an electric analog signal representative of pressure. The signal is amplified and displayed on a meter. Before dynamic measurements begin, it is necessary that the output of the amplifier be zero when there is no input to the transducer. Such transducers sometimes contain an active bridge which must be adjusted for zero output by adjusting a potentiometer while the hydraulic side of the transducer is open and referred to the atmosphere before blood pressure measurements begin.

The new device has a knob that is depressed to engage a zero adjustment potentiometer when zero adjustment is in progress. When depressed, the knob also increases meter sensitivity by operating a switch which connects a low impedance in shunt with the normal higher impedance that is in series with the meter. After obtaining apparent zero by adjusting the potentiometer and observing the meter while it is connected for high sensitivity, the knob is released and the meter is restored to normal sensitivity. If true zero was not reached, the meter deflects or exhibits a kick when sensitivity is changed in which case the potentiometer is adjusted further until no deflection is perceived. The new device is based on the fact that the eye can detect motion in most instances where it cannot resolve the distance over which the motion takes place. The fact that deflection of the meter needle is depended on makes zero adjustment independent of parallax.

An important feature and object of the invention is to preclude changing zero adjustment inadvertently once it is set for a particular subject. This is achieved by automatic retraction of the adjusting knob and shaft and disengagement of the potentiometer drive so that merely turning the knob will have no effect.

A detailed description of the new zero adjusting device will now be set forth in reference to the drawing.

DESCRIPTION OF THE INVENTION

Figure 1:
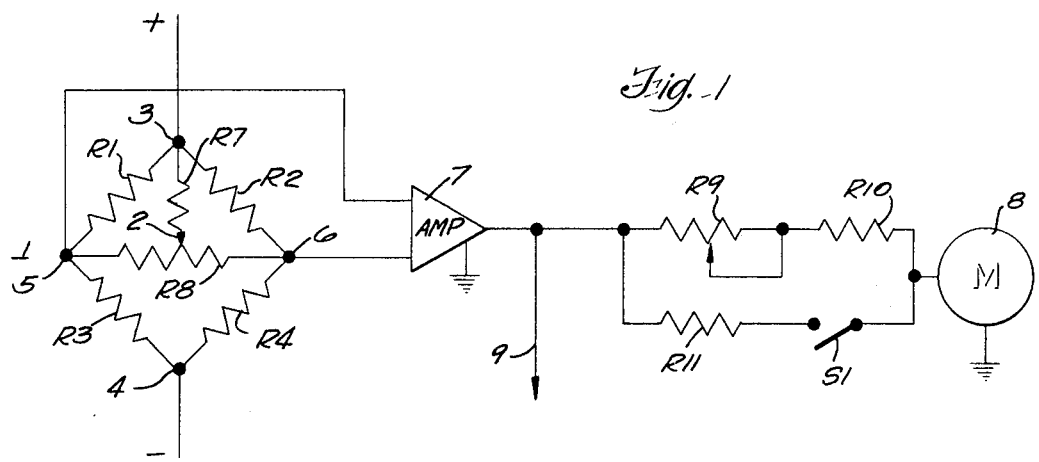
FIG. 1 is a schematic diagram of a typical metering circuit in which the new zero setting device may be used; and, FIG. 2 is a side elevational view of the zero setting device.

FIG. 1 shows a typical circuit in which the invention may be used. In this circuit there is an active bridge 1 made up of strain gage resistances R1, R2, R3 and R4. The strain gages are subject to hydraulic pressure changes such as may occur in a blood pressure-to-analog signal transducer. The bridge is excited by direct current applied to its corners 3 and 4. The variable output signal corresponding with pressure is derived from its corners 5 and 6. The output signal is furnished to an amplifier 7.

In bridge 1, a potentiometer resistor R8 is connected across output terminals 5 and 6. This potentiometer has an adjustment arm 2 in series with resistor R7. Potentiometer arm 2 may be positioned on R8 at a point that results in the bridge being balanced and the reading on a meter 8 being zero. The invention achieves setting meter 8 at true zero when bridge 1 is balanced.

The amplified output signal from amplifier 7 is supplied to meter 8 through serially connected potentiometer R9 and a fixed resistor R10. With these resistances connected in series with meter 8, the latter has normal sensitivity. Also provided is an impedance in the form of resistor R11 which is in series with a switch S1, both of the latter being shunted across R9 and R10. When switch S1 is closed, a small current from amplifier 7 will cause a relatively great deflection in meter 8 as compared with the normal meter sensitivity that prevails when only R9 and R10 are in series with it. Stated in another way, when switch S1 is closed, the impedance in series with meter 8 is low and meter sensitivity is higher than normal. Thus, a relatively small voltage or current from the amplifier will cause a greater deflection of the meter. When S1 is open, impedance in series with the meter is high and sensitivity is relatively low.

The zero balancing procedure involves adjusting arm 2 of potentiometer R8 in bridge 1 until meter 8 reads what appears to be zero when S1 is closed and the meter is most sensitive to small deviations from zero. These small deviations may not be seen because of parallax and limitations on the resolving power of the eyes. When switch S1 is opened, however, the sensitivity of meter 8 decreases and the small deflection that accompanies a small deviation produces a smaller meter deflection. This results in movement of the needle or other indicator in meter 8. This movement can be readily detected by the eyes even though it is very small. Switch S1 is then repeatedly closed, usually a couple of times, and potentiometer R8 is adjusted until no meter deflection is observed when switch S1 is finally opened. Attainment of true zero is then highly certain. In FIG. 1, the output signal from amplifier 7 may be taken off on a conductor 9 and used for other purposes.

Figure 2:
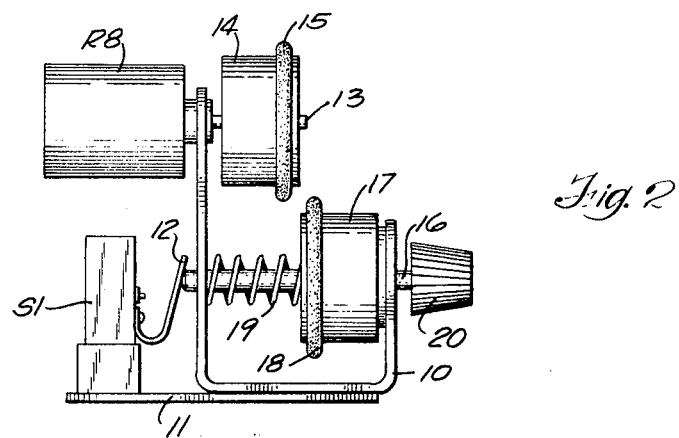

A new device that is applicable in many situations where accurate zero adjustment is required is shown in FIG. 2. The device comprises a U-shaped chassis 10 on which switch S1 is mounted by means of a bracket 11. Switch S1 has an operating arm 12. Potentiometer R8 is also mounted on chassis 10. Extending from potentiometer R8 is its operating shaft 13. Shaft 13 has a wheel 14 fixed on it and the wheel has a circumferential groove in which there is a rubber O-ring 15.

An operating shaft 16 is also journalled in opposite legs of chassis 10. Shaft 16 has a wheel 17 fixed on it and the wheel has a circumferential O-ring 18. The two wheels 14 and 17 and their O-rings 15 and 18 are normally held out of engagement with each other by a compression spring 19 which is interposed between one leg of chassis 10 and wheel 17.

A knob 20 on shaft 16 may be pressed to urge wheel 17 to the left and effect frictional engagement between driving O-ring 18 and driven O-ring 15. Thus, when shaft 16 is pressed axially to the left in opposition to spring 19, the O-rings engage and enable wheel 14 to be turned for changing the potentiometer setting when knob 20 is rotated. When the wheels engage, the end of shaft 16 operates switch S1 by pressing against its operating arm 12. The axes of the shafts and wheels need not be parallel to each other as shown. They may be at an angle with each other as long as the wheels engage and the switch S1 is operated when one shaft is moved.

As explained earlier in reference to FIG. 1, when switch S1 closes, a low impedance path through R11 exists between amplifier 7 and meter 8. Meter sensitivity is then high. At the same time the potentiometer R8 in bridge 1 is adjustable by reason of wheels 14 and 17 being engaged. When the operator releases knob 20, shaft 16 retracts, wheels 14 and 17 are disengaged and inadvertent changing of the potentiometer setting by turning knob 20 is precluded. If a kick or small meter deflection is observed when knob 20 is released, zero has not been attained and the process is repeated. Usually, it is necessary to switch the meter back and forth between high and low sensitivity modes and adjust the potentiometer a couple of times to eliminate all meter deflection and thereby become highly certain that zero input to amplifier 7, in this example, has been attained.

Although the new zero adjusting device has been described in a particular metering circuit application, such description is to be construed as illustrative rather than limiting, for the device may be used in various applications and is to be limited only by interpretation of the claims which follow.

I claim:
1. A device for facilitating setting an electric signal producing means to true zero output, comprising:
   (a) a fixedly mounted potentiometer which is adjustable to effect zero output from the signal producing means, said potentiometer having a shaft,
   (b) a first driven wheel means on said potentiometer shaft,
   (c) another shaft that is mounted for rotation and for axial movement,
   (d) a second driving wheel means on said other shaft, which wheel means is axially movable in one direction with said other shaft to effect engagement of both of the wheel means,
   (e) spring means normally urging said axially movable wheel means and shaft out of engagement with the wheel on the potentiometer shaft,
   (f) a meter sensitivity control switch located for being operated by movement of said axially movable shaft, whereby engagement of said wheel means to operate said potentiometer for zero adjustment operates said sensitivity control switch simultaneously.

2. A device for facilitating setting an electric signal producing means to true zero output, comprising:
   (a) an amplifier connected to receive an input signal and having an output terminal,
   (b) a metering circuit connected to said output terminal and including a meter indicating the value of the output signal, said metering circuit including a high value impedance in series with the meter and a low value impedance and a serially connected switch in parallel with the high value impedance,
   (c) a device for determining whether the output of the amplifier is at true zero when there is no input signal,
   (d) said zero determining device comprising
      (1) a support,
      (2) a potentiometer mounted on said support and having a shaft, said potentiometer shaft being rotatably adjustable to a position that corresponds with true zero,
      (3) a second shaft journalled for rotation and for axial movement in parallelism with the potentiometer shaft,
      (4) wheel means on each shaft engageable with each other for joint rotation,
      (5) spring means normally urging said second shaft axially and thereby preventing said wheels from engaging,
      (6) said above-mentioned switch being located for being operated by moving said second shaft axially whereupon said wheels are engaged to enable adjustment of said potentiometer and to connect said low value resistor in series with said meter to increase its sensitivity.

References Cited
UNITED STATES PATENTS
2,968,765   1/1961   Parmater et al. _____ 324—115 XR RUDOLPH V. ROLINEC, Primary Examiner E. F. KARLSEN, Assistant Examiner U.S. Cl. X.R.

324—74